(12) United States Patent
Brumbaugh

(10) Patent No.: US 7,340,844 B2
(45) Date of Patent: Mar. 11, 2008

(54) DEVICE FOR MOUNTING A POSITION MEASURING DEVICE ONTO A MACHINE TOOL, AND POSITION MEASURING SYSTEM

(75) Inventor: Michael Brumbaugh, Jamestown, NY (US)

(73) Assignee: Acu-Rite Companies, Inc., Jamestown, NY (US)

( * ) Notice: Subject to any disclaimer, the term of this patent is extended or adjusted under 35 U.S.C. 154(b) by 35 days.

(21) Appl. No.: 11/354,307

(22) Filed: Feb. 13, 2006

(65) Prior Publication Data

US 2007/0186430 A1    Aug. 16, 2007

(51) Int. Cl.
G01D 21/00 (2006.01)
G01B 7/00 (2006.01)
(52) U.S. Cl. ....................................................... 33/706
(58) Field of Classification Search ................. 33/706, 33/707, 708, 710, 712
See application file for complete search history.

(56) References Cited

U.S. PATENT DOCUMENTS

| 4,273,447 A | * | 6/1981 | Nelle | 356/619 |
| 4,530,157 A | * | 7/1985 | Nelle | 33/700 |
| 5,016,359 A | * | 5/1991 | Nagaoka et al. | 33/702 |
| 6,578,283 B2 | * | 6/2003 | Nishi | 33/706 |
| 6,820,348 B2 | | 11/2004 | Brumbaugh | |
| 2005/0028394 A1 | | 2/2005 | Brumbaugh | |

OTHER PUBLICATIONS

U.S. Appl. No. 11/233,594.
Brochure, "Newall—Newall Measurement Systems Ltd.—Spherosyn & Microsyn—Linear Encoders," Jun. 2004, obtained from: http://www.newall.com/PDFs/downloads_led_manual_spher-micro.pdf.
Brochure, "Newall—Linear Encoders," Jul. 2005.
Brochure, "Newall—Linear Encoders," obtained from http://www.newall.co.uk/pdf/Encoder%20Catalogue04.pdf on Apr. 18, 2006.

* cited by examiner

*Primary Examiner*—Christopher W Fulton
(74) *Attorney, Agent, or Firm*—Kenyon & Kenyon LLP

(57) ABSTRACT

A bracket set is for mounting an encoder device to a machine tool. The bracket set includes a first connector connectable to the machine tool; a first member adjustably connected to the first connector, a longitudinal axis of the first member arranged transverse to a longitudinal axis of the first connector; a second member adjustably connected to the first member, a longitudinal axis of the second member arranged transverse to the longitudinal axis of the first member; and a second connector adjustably connectable to the encoder device, a longitudinal axis of the second connector arranged transverse to the longitudinal axis of the second member.

24 Claims, 11 Drawing Sheets

DEVICE FOR MOUNTING A POSITION MEASURING DEVICE ONTO A MACHINE TOOL, AND POSITION MEASURING SYSTEM

FIELD OF THE INVENTION

The present invention relates to a device for mounting a position measuring device, e.g., a linear encoder, onto a machine tool and to a position measuring system.

BACKGROUND INFORMATION

One or more axes of a manually-operated machine tool may be retrofitted with a linear encoder. The linear encoder generates position dependent output signals so that the machine tools can be operated as numerically controlled machines.

U.S. Pat. No. 6,820,348, U.S. patent application publication No. 2005/0028394, and U.S. patent application Ser. No. 11/233,591, filed on Sept. 22, 2005, entitled "Device and Method for Mounting a Position Measuring Device onto a Machine Tool, and Position Measuring System," Publication No. 2007/0063114, which are expressly incorporated herein in their entireties by reference thereto, describe devices and methods that may minimize the number of steps required to mount a linear encoder to a machine tool.

Certain linear encoders, e.g., SPHEROSYN and MICROSYN linear encoders, which are believed to be available from Newall Measurement Systems Ltd., may be supported using a support bracket. This support bracket is designed to support the scale of the linear encoder by passing the scale through a bore in the support bracket.

While these devices may reduce the number of steps required to attach an encoder to a machine tool, a need is believed to exist to further facilitate the mounting process of an encoder or spar to a machine tool and also to allow for multi-axis adjustment of the encoder position after it is already attached to the machine tool.

SUMMARY

According to an example embodiment of the present invention, a bracket set for mounting an encoder device to a machine tool includes: a first connector connectable to the machine tool; a first member adjustably connected to the first connector, a longitudinal axis of the first member arranged transverse to a longitudinal axis of the first connector; a second member adjustably connected to the first member, a longitudinal axis of the second member arranged transverse to the longitudinal axis of the first member; and a second connector adjustably connectable to the encoder device, a longitudinal axis of the second connector arranged transverse to the longitudinal axis of the second member.

The first member may be extendable in a direction parallel to the longitudinal axis of the first member to adjust a spacing between the first connector and the second member in the direction parallel to the longitudinal axis of the first member.

The first member may include a first telescoping segment and a second telescoping segment.

The first member may be movably connected to the first connector at least one of (a) in a direction parallel to the longitudinal axis of the first connector and (b) about the longitudinal axis of the first connector.

The second member may be movably connected to the first member at least one of (a) in a direction parallel to the longitudinal axis of the second member and (b) about the longitudinal axis of the second member.

The second connector may be movably connected to the second member at least one of (a) in a direction parallel to the longitudinal axis of the second connector and (b) about the longitudinal axis of the second connector.

The bracket set may include at least one lock device, e.g., a set screw, adapted to lock at least one of (a) the first connector relative to the first member, (b) the first member relative to the second member and (c) the second connector relative to the second member.

The first connector may include a threaded end.

The second connector may be adjustably connectable to at least one of (a) a scale, (b) a spar and (c) a support of the encoder device.

According to an example embodiment of the present invention, a bracket system for mounting an encoder device to a machine tool includes a plurality of bracket sets. Each of the bracket sets includes: a first connector connectable to the machine tool; a first member adjustably connected to the first connector, a longitudinal axis of the first member arranged transverse to a longitudinal axis of the first connector; a second member adjustably connected to the first member, a longitudinal axis of the second member arranged transverse to the longitudinal axis of the first member; and a second connector adjustably connectable to the encoder device, a longitudinal axis of the second connector arranged transverse to the longitudinal axis of the second member.

The first member of at least one bracket set may be extendable in a direction parallel to the longitudinal axis of the first member to adjust a spacing between the first connector and the second member in the direction parallel to the longitudinal axis of the first member.

A first bracket set may be adjustably connectable to a first end of the encoder device, and a second bracket set may be adjustably connectable to a second end of the encoder device.

A third bracket set may be adjustably connectable to the encoder device at a location in between the first end and the second end.

The third bracket set may be adjustably connectable to a support of the encoder device.

According to an example embodiment of the present invention, a system includes: an encoder device mountable on a machine tool; a first bracket set connectable to a first end of the encoder device; and a second bracket set connectable to a second end of the encoder device. Each of the bracket sets includes: a first connector connectable to the machine tool; a first member adjustably connected to the first connector, a longitudinal axis of the first member arranged transverse to a longitudinal axis of the first connector; a second member adjustably connected to the first member, a longitudinal axis of the second member arranged transverse to the longitudinal axis of the first member; and a second connector adjustably connectable to the encoder device, a longitudinal axis of the second connector arranged transverse to the longitudinal axis of the second member.

Each bracket set may be adjustably connectable to at least one of (a) a scale and (b) a spar of the encoder device.

The system may include a third bracket set connectable to the encoder device in between the first end and the second end. The third bracket set may include: a first connector connectable to the machine tool; a first member adjustably connected to the first connector, a longitudinal axis of the first member arranged transverse to a longitudinal axis of the first connector; a second member adjustably connected to the first member, a longitudinal axis of the second member arranged transverse to the longitudinal axis of the first member; and a second connector adjustably connectable to the encoder device, a longitudinal axis of the second connector arranged transverse to the longitudinal axis of the second member.

The third bracket set may be adjustably connectable to a support of the encoder device.

The first member of at least one of (a) the first bracket set and (b) the second bracket set may be extendable in a direction parallel to the longitudinal axis of the first member to adjust a spacing between the first connector and the second member in the direction parallel to the longitudinal axis of the first member.

The longitudinal axis of the second connector of each bracket set may be arranged orthogonal to a longitudinal axis of the encoder device.

The encoder device may include an opening arranged at each of the first end and the second end and arranged orthogonal to a longitudinal axis of the encoder device, and the second connectors may be insertable into the openings.

Example embodiments of the present invention are described in more detail below with reference to the appended Figures.

DETAILED DESCRIPTION

Figure 1:
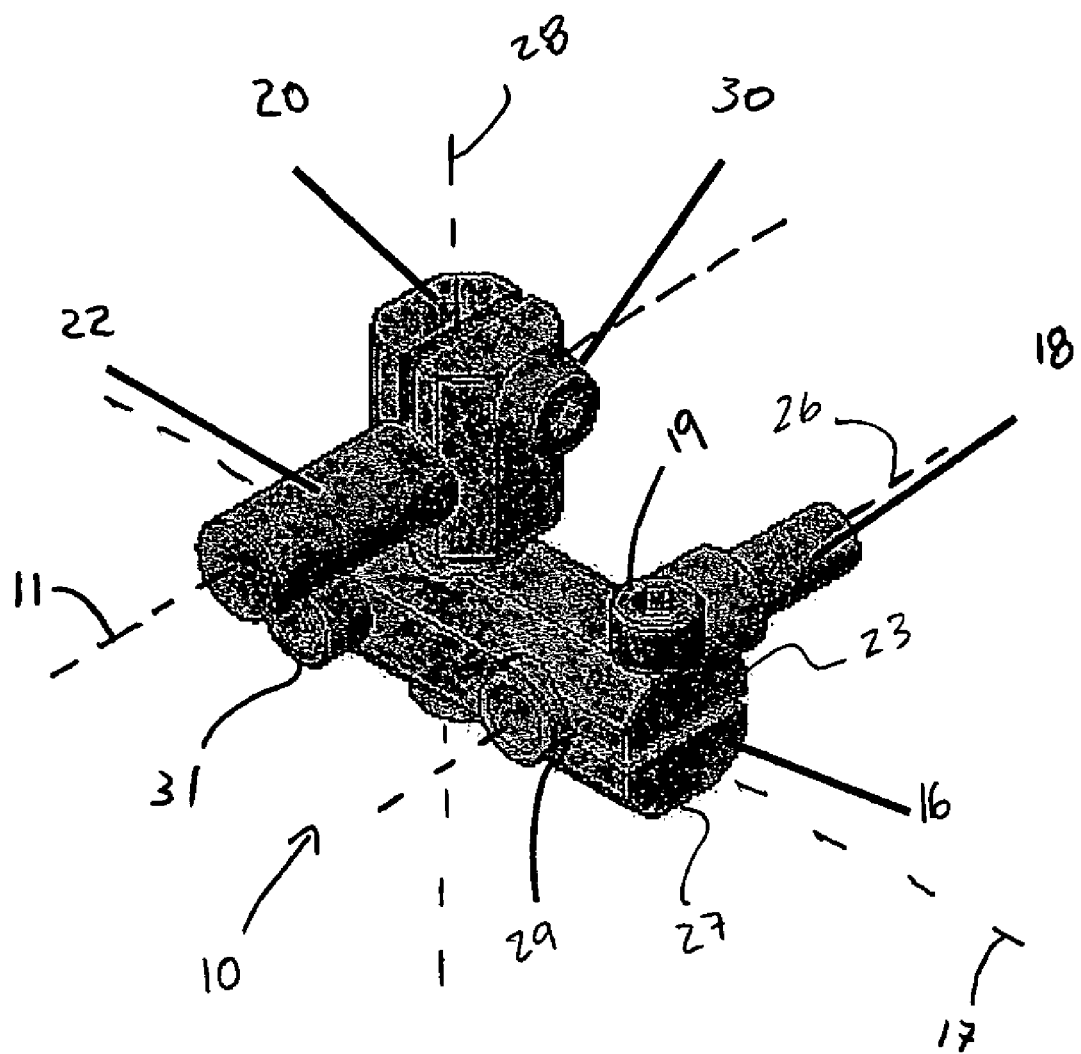
FIG. 1 is a perspective view of a bracket set according to an exemplary embodiment of the present invention.
Figure 2:
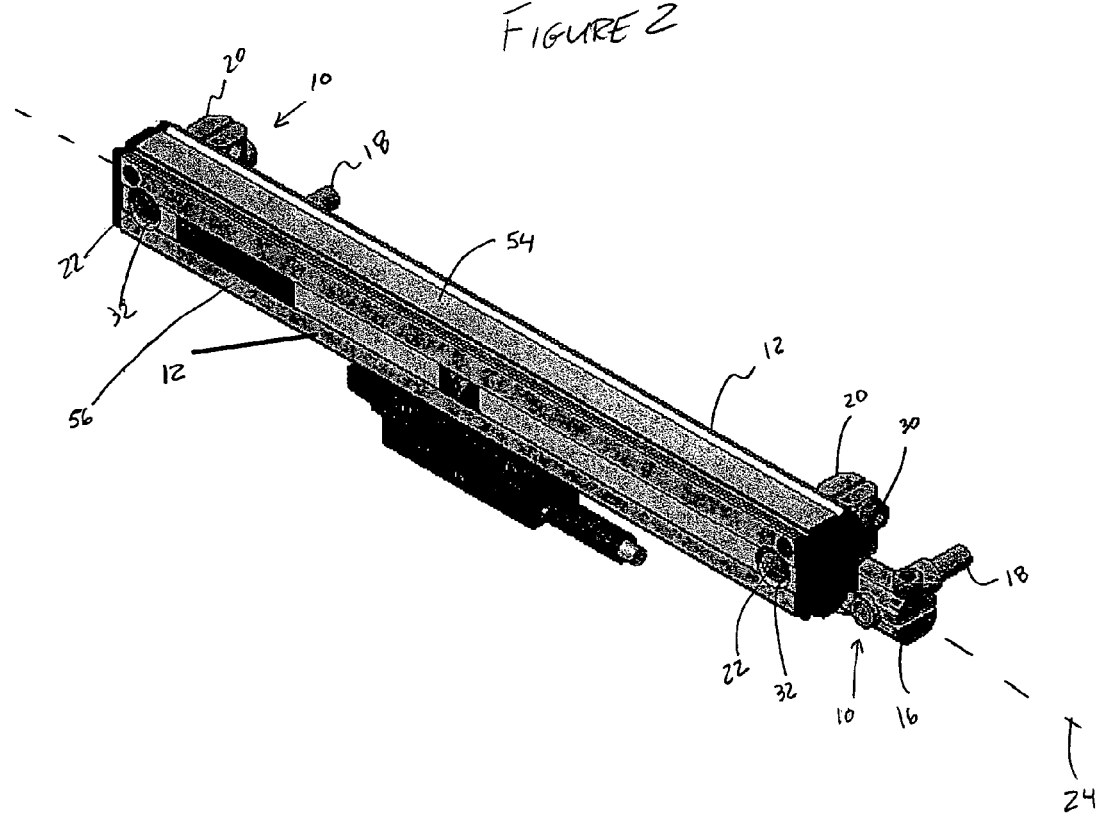
FIG. 2 is a perspective view of an encoder mounted on a pair of the bracket sets illustrated in FIG. 1.

FIG. 1 is a perspective view of a bracket set 10 for mounting a position measuring device, such as a linear encoder 12 or a spar 50 (FIG. 5), on a surface 14 of a machine tool (FIG. 3), such as a milling machine or mill. FIG. 2 illustrates a pair of bracket sets 10 mounted on the encoder 12. Encoder 12 is used, for example, to track the position of a mill table relative to a mill saddle. Bracket set 10 is adjustable and may be used to adjust the positioning of the encoder 12 on the machine tool. Bracket set 10 may also be used in place of or in combination with a spacer or standoff element so as to space the encoder 12 a predetermined distance away from the machine tool on which it may be mounted.

As illustrated in FIG. 1, bracket set 10 includes (i) a first member, for example, a bar 16, (ii) a first connector, for example, a threaded post 18, (iii) a second member, for example, a swivel post clamp 20, and (iv) a second connector, for example, a mounting lug 22. The bar 16, when mounted to the encoder 12, extends along axis 17 in a direction parallel to a longitudinal axis of the encoder 12. The threaded post 18 extends along an axis 26, the swivel post clamp 20 extends along an axis 28, and the mounting lug 22 extends along an axis 11. As illustrated in FIG. 1, longitudinal axis 24 of the encoder 12, axis 26 and axis 28 may be mutually orthogonal to each other. The orientation of mounting lug 22 may change given that swivel post clamp 20 may swivel about axis 28 inside bar 16 when locking fastener 31 is loosened. As shown in FIG. 1, the mounting lug 22 projects from the swivel post clamp 20 in a direction parallel to axis 26. Mounting lug 22 fits into a bore 32 in encoder 12 and thereby supports encoder 12 using a portion of mounting lug 22 entirely outside swivel post clamp 20. A locking set screw 34 (FIG. 3) may be used to lock mounting lug 22 in bore 32. A locking set screw 52 (FIG. 6) may be used to lock mounting lug 22 in spar 50.

Threaded post 18 fits in a bore 29 in the bar 16 and is secured in place by tightening locking fastener 19. Tightening locking fastener 19 squeezes opposing portions 23 and 27 of bar 16 towards each other thereby clamping threaded post 18 in bore 29. Mounting lug 22 is clamped in swivel post clamp 20 using locking fastener 30, and swivel post clamp 20 is clamped in bar 16 using locking fastener 31.

While FIG. 2 illustrates a pair of bracket sets 10 it should be appreciated that any number of bracket sets may be provided, depending, e.g., on the length of the encoder 12, etc. For example, a single bracket set 10 may be provided or more than two bracket sets 10 may be provided.

Figure 3:
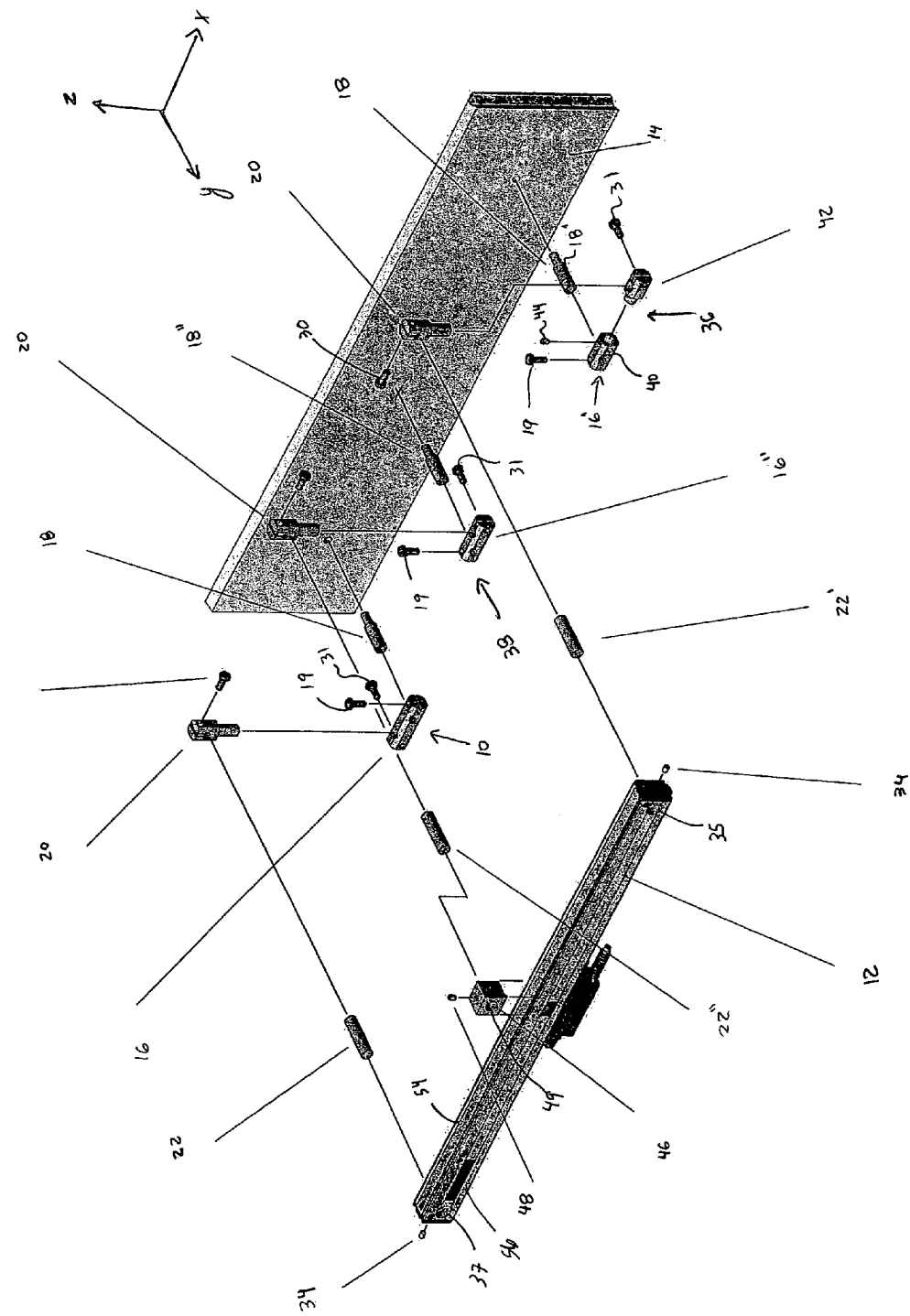
FIG. 3 is an exploded view of three bracket sets used to mount an encoder to a machine tool surface.

FIG. 3 is an exploded view of the encoder 12 connectable to surface 14 using bracket set 10 as well as with bracket set 36 and bracket set 38. Bracket set 38 connects to a center support 46, which may be secured via a set screw 48. Center support 46 may be removably secured to a middle portion of encoder 12, for example, using a set screw.

Bracket set 36 is reversed in configuration with respect to bracket set 10 and, thus, the swivel post clamp 20 and threaded post 18 of bracket set 36 are connected on opposite sides of the bar 16. While the bar 16 in bracket set 10 is a unitary body, the bar 16' in bracket set 36 is an extension bar including a first portion 40 and a telescoping second portion 42, which may be secured to the first portion 40 using a set screw 44. Bracket set 38 is similar to bracket set 10 except the bar 16" is shorter in length than bar 16 of bracket set 10.

Figure 4:
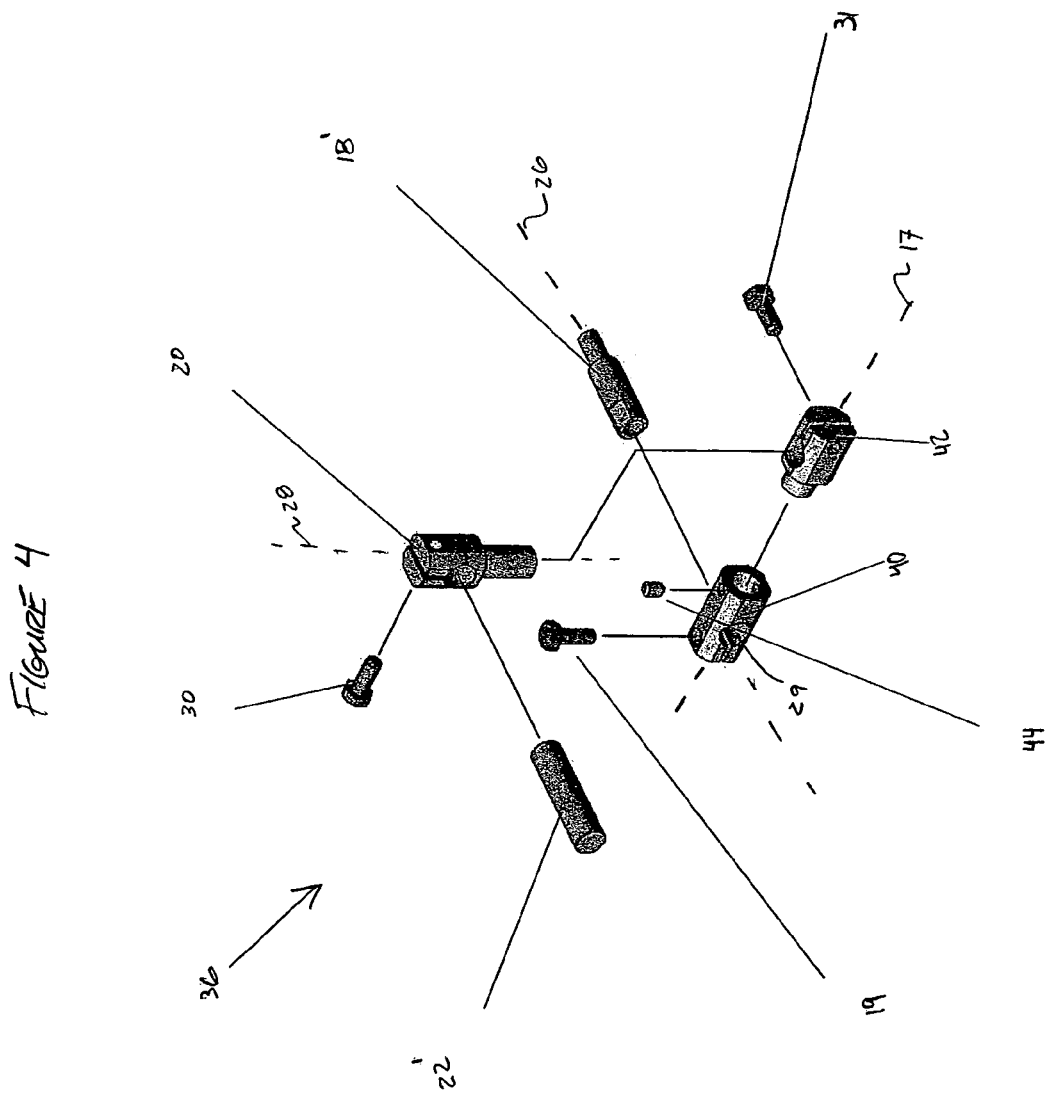
FIG. 4 is an exploded view of a bracket set according to an exemplary embodiment of the present invention.

FIG. 4 is an exploded view of bracket set 36. As illustrated in FIG. 4, bar 16' includes first and second telescoping portions 40, 42, which may be secured together using a set screw 44. Thus, by relative positioning of the first and second telescoping portions 40, 42, the relative distance between threaded post 18' of mounting lug 22' may be adjusted. This may facilitate mounting of the encoder 12 and/or spar 50 as more fully described below.

Figure 5:
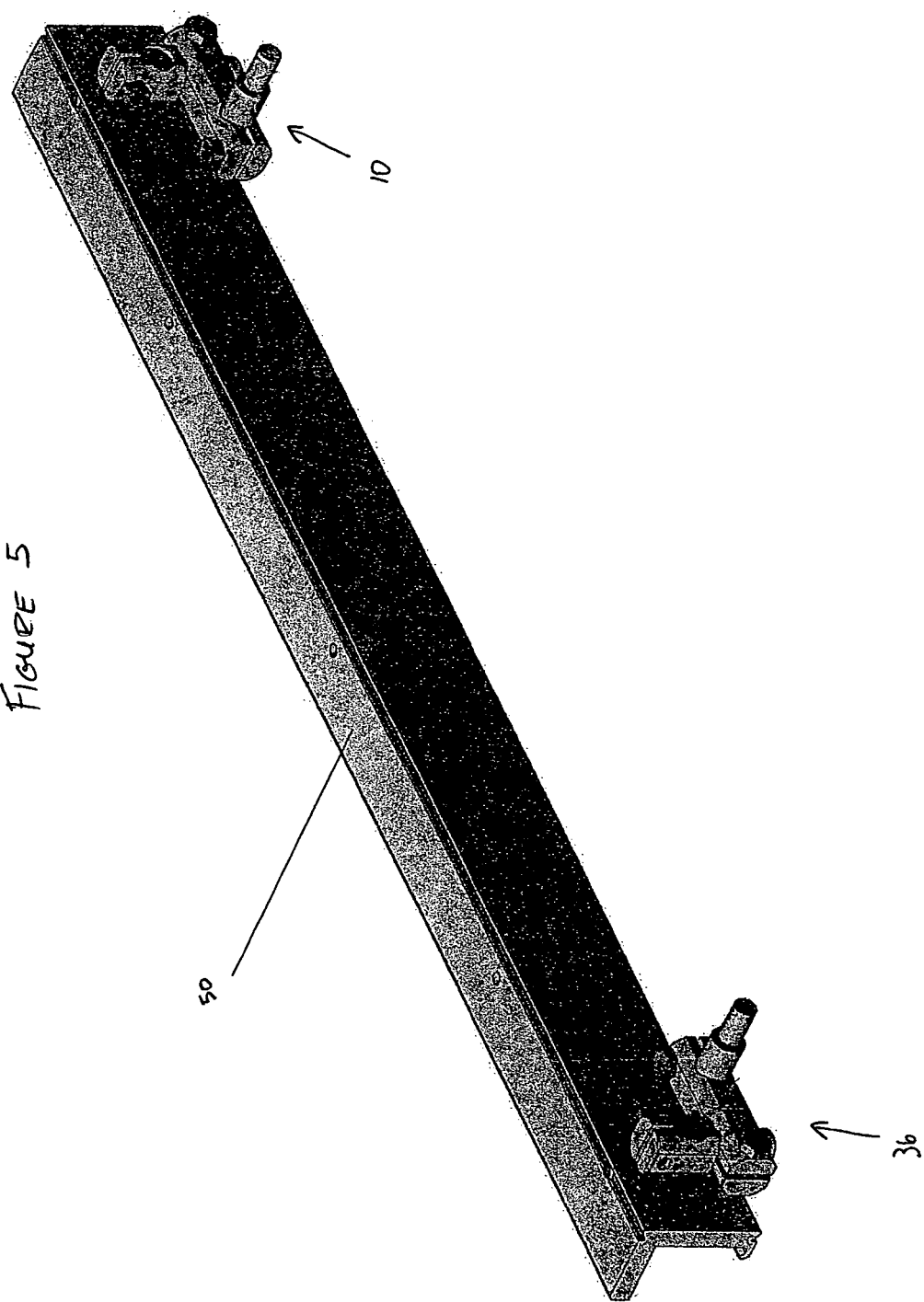
FIG. 5 is a perspective view of a pair of bracket sets mounted on a spar.
Figure 6:
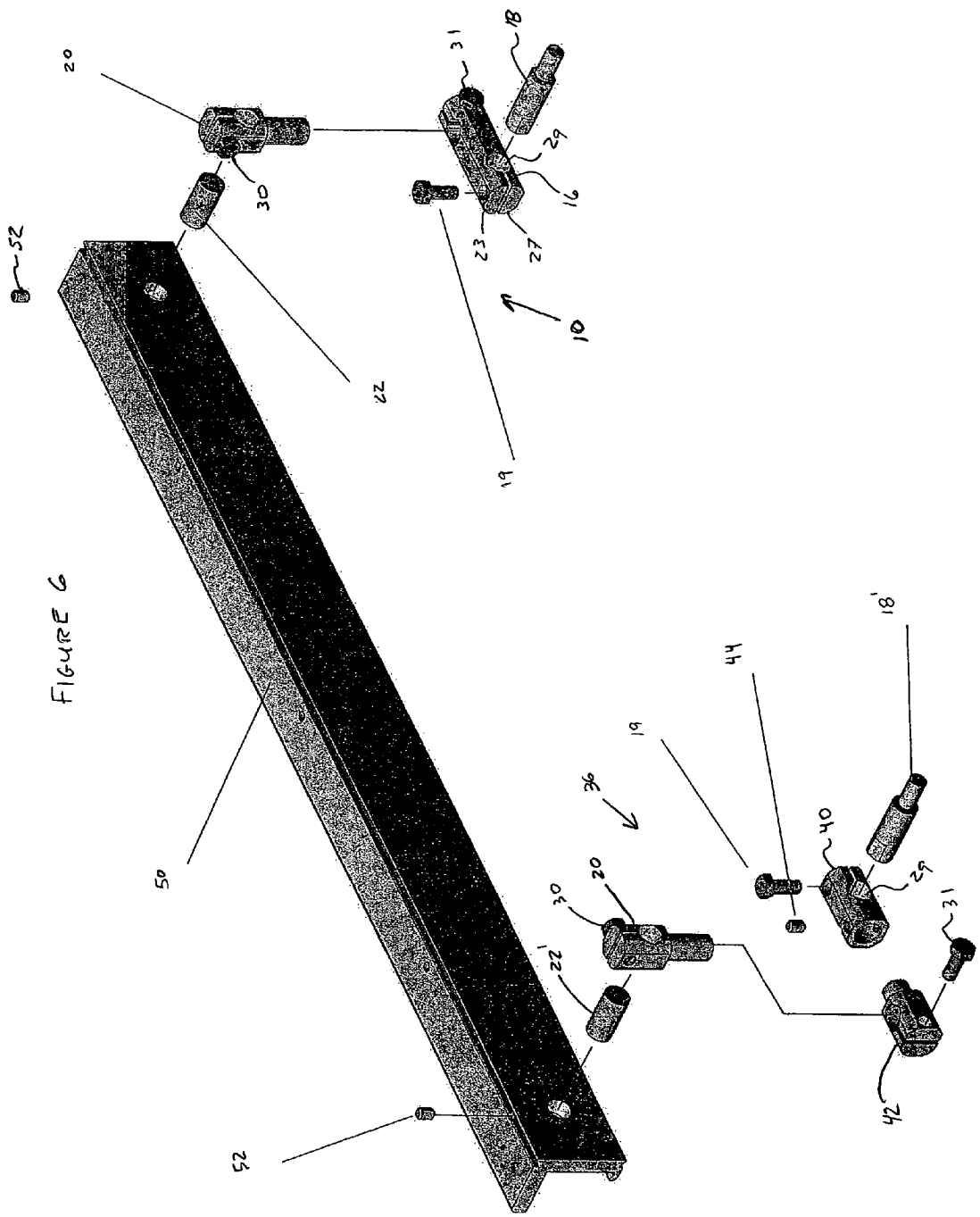
FIG. 6 is an exploded view of the spar and bracket sets illustrated in FIG. 5.

Bracket set 10, 36, 38 may also be used to mount a spar 50 to surface 14. FIG. 5 illustrate spar 50 with bracket set 36 and bracket set 10 connected to spar 50. FIG. 6 is an exploded view of bracket set 36 and bracket set 10 connectable to spar 50. Mounting lugs 22 may be removably connected to spar 50 using, for example, set screws 52.

While FIGS. 3 and 5 illustrate that bracket sets 10, 36 adjacent the ends of the encoder 12 and spar 50 and bracket set 38 in the middle of the encoder 12, it should be appreciated that the bracket sets 10, 36, 38 may be mounted at any appropriate location along the length of the encoder 12 or spar 50.

The encoder 12 is mountable to surface 14 as follows. As an initial step, screws and fasteners 19, 30, 31 and 44 are tightened just enough to hold the bracket sets 10, 36 and 38 in assembled position. The mounting lug 22' of bracket set 36 is inserted into a first bore 35 on one end of the encoder 12 and locked in place using set screw 34', and the mounting lug 22 of bracket set 10 is inserted into a second bore 37 on an opposite end of the encoder 12 and locked in place using set screw 34.

Next, the encoder and bracket set assembly is held near its intended mounting position on the machine tool and a top surface 54 of the encoder 12 (or spar 50) is aligned approximately parallel with the axis travel ways of the machine tool to which the encoder 12 is being mounted. A level may be used to assist with this alignment. Next, the mounting lug locations are marked on the machine mounting surface 14. Alternatively, a mounting lug 22 on one end of the encoder 12 may be attached to the machine mounting surface 14 first and then, using the encoder 12 as a template, the other end mounting hole may be marked.

Alternatively, devices described, for example, in U.S. Pat. No. 6,820,348, U.S. patent application publication No. 2005/0028394, and U.S. patent application Ser. No. 11/233,594, filed on Sep. 22, 2005, entitled "Device and Method for Mounting a Position Measuring Device onto a Machine Tool, and Position Measuring System," which are expressly incorporated in their entireties by reference thereto, may be used to mark the position of the mounting holes on the machine tool and/or to assist in positioning the encoder 12.

Next, the entire assembly may be removed and holes, for example, ¼-20×½ inch deep, may be drilled in the surface 14 and tapped at the marked mounting post locations. The mounting lugs 22, 22', 22", which may be threaded, are removed from the bracket assemblies 10, 36 and 38 and secured to the machine by screwing them into the mounting holes. The encoder 12 and bracket sets 10, 36 and 38 may be loosely connected to the mounting lugs 22.

Figure 7:
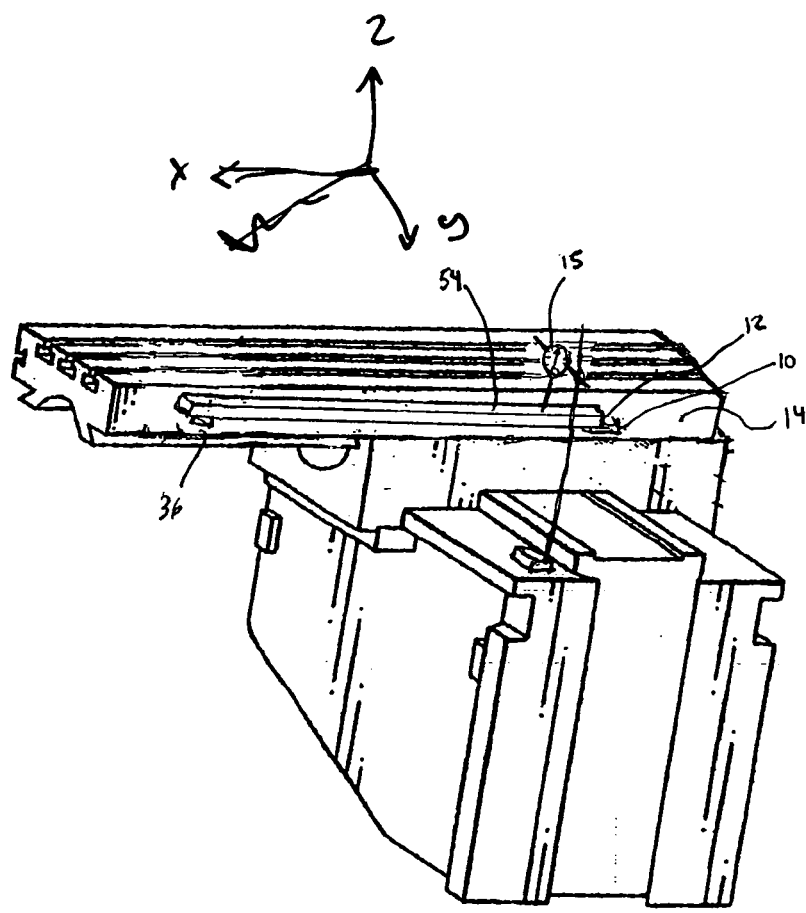
FIG. 7 is a perspective view of a machine tool and a dial indicator mounted thereon contacting a top surface of the encoder with the machine tool table in a first terminal position.
Figure 8:
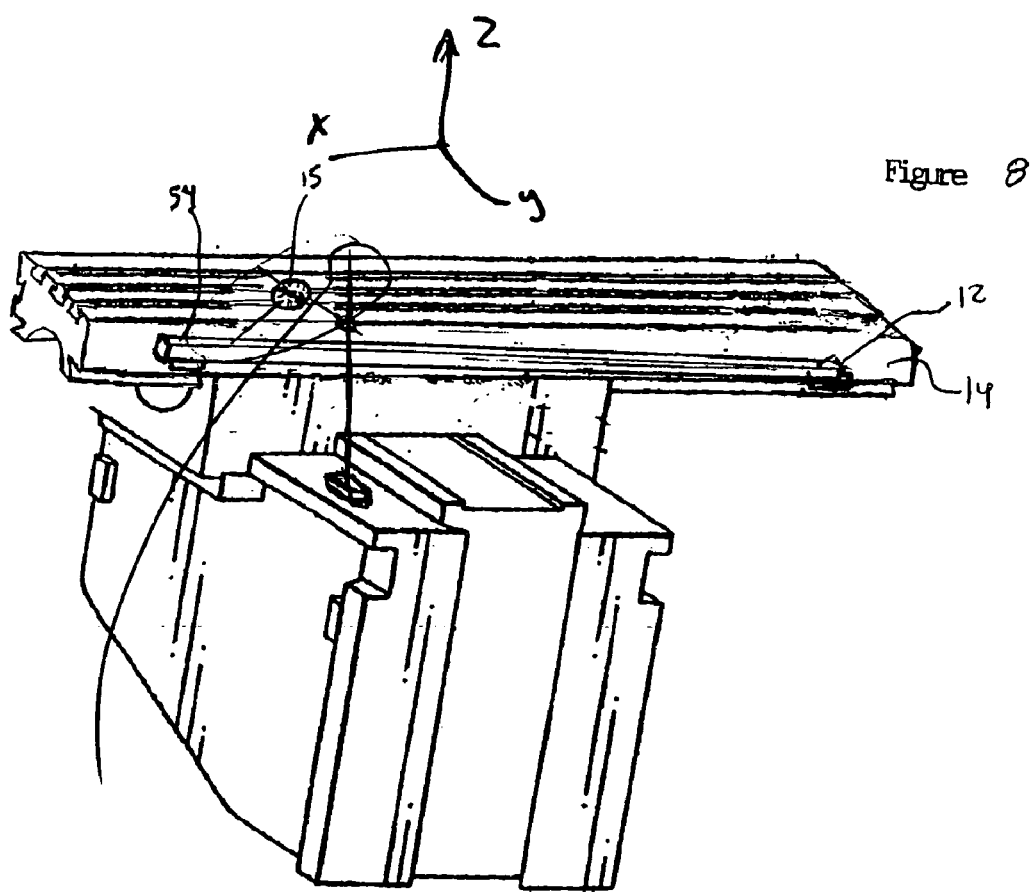
FIG. 8 is a perspective view of the machine tool and the dial indicator mounted thereon illustrated in FIG. 7 contacting a top surface of the encoder with the machine tool table in a second terminal position.

Next, with the encoder 12 mounted on the surface 14, the machine tool component carrying surface 14 is translated to one of its terminal positions. As illustrated in FIG. 7, a measuring device 15, such as depth micrometer or dial indicator, is placed at a reference position or surface of the machine tool to locate a position of the top surface 54 of one end of the encoder 12 or spar 50. One of the bracket sets, for example, bracket set 10, is secured in place and the indicator set to zero. As illustrated in FIG. 8, the component of the machine tool carrying surface 14 is translated to its opposite terminal position so the measuring device measures a vertical distance of the top surface 54 of the encoder 12 to the reference position or surface at the opposite end of the encoder 12. The bracket set 36 is adjusted, for example, by shifting swivel post clamp 20 vertically along the z-axis, so that the indicator reads zero. The bracket set 36 is then secured in place, for example, by tightening the locking fasteners 19, 30, 31 and set screw 44.

Figure 9:
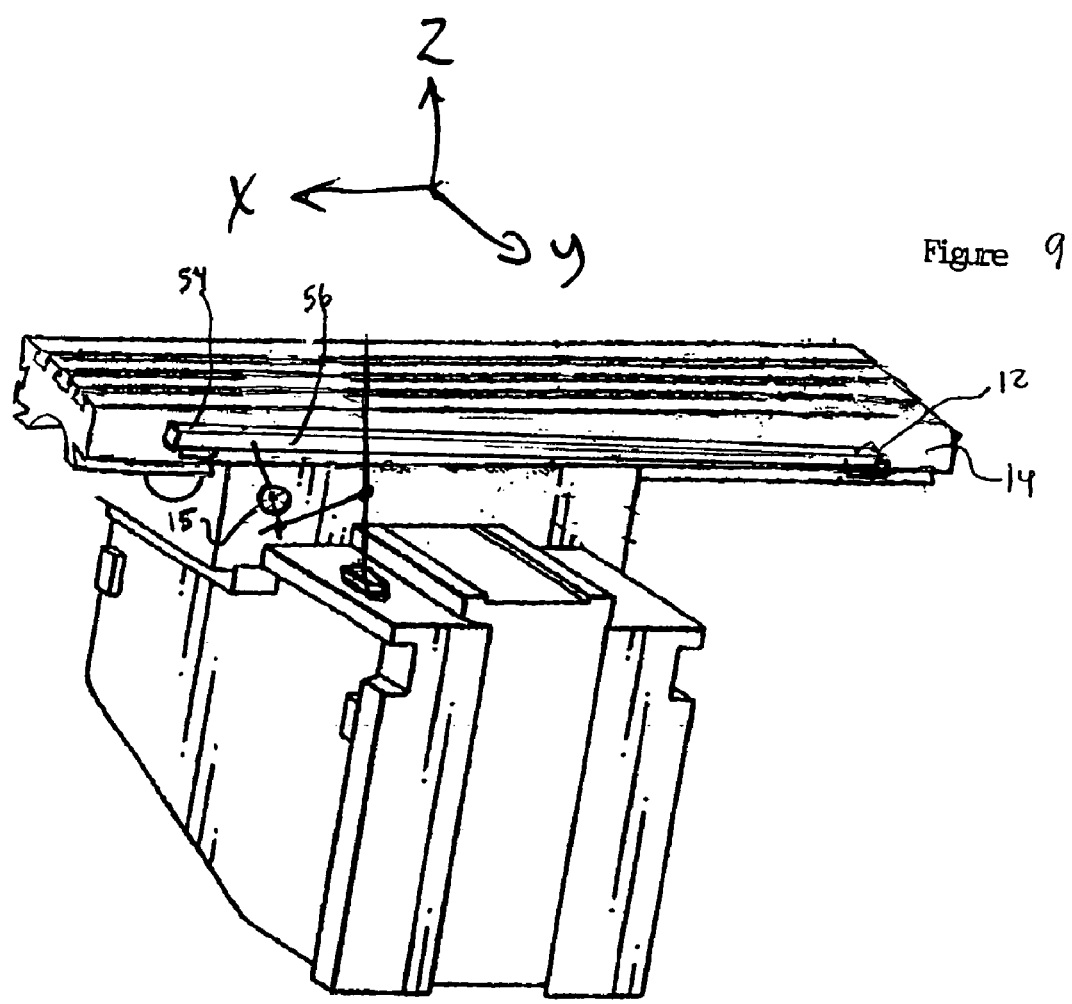
FIG. 9 is a perspective view of the machine tool and the dial indicator mounted thereon illustrated in FIGS. 7 and 8 contacting a front surface of the encoder with the machine tool table in the second terminal position.
Figure 10:
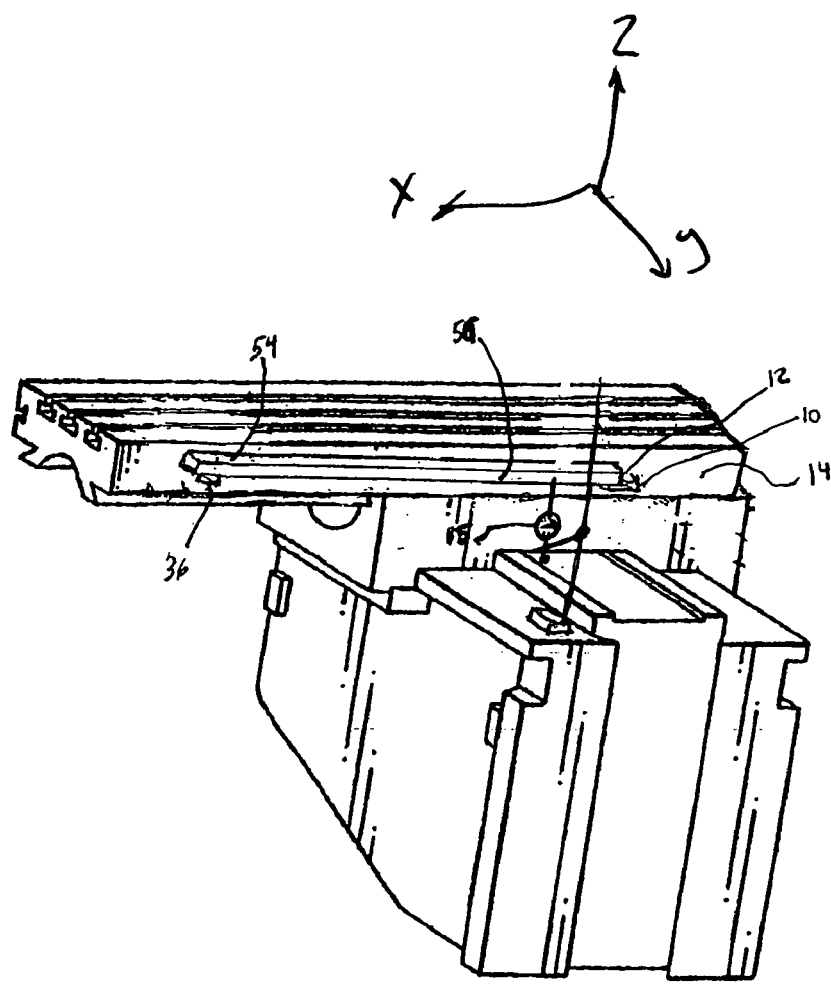
FIG. 10 is a perspective view of the machine tool and the dial indicator mounted thereon illustrated in FIGS. 7 to 9 contacting a front surface of the encoder with the machine tool table in the first terminal position.
Figure 11:
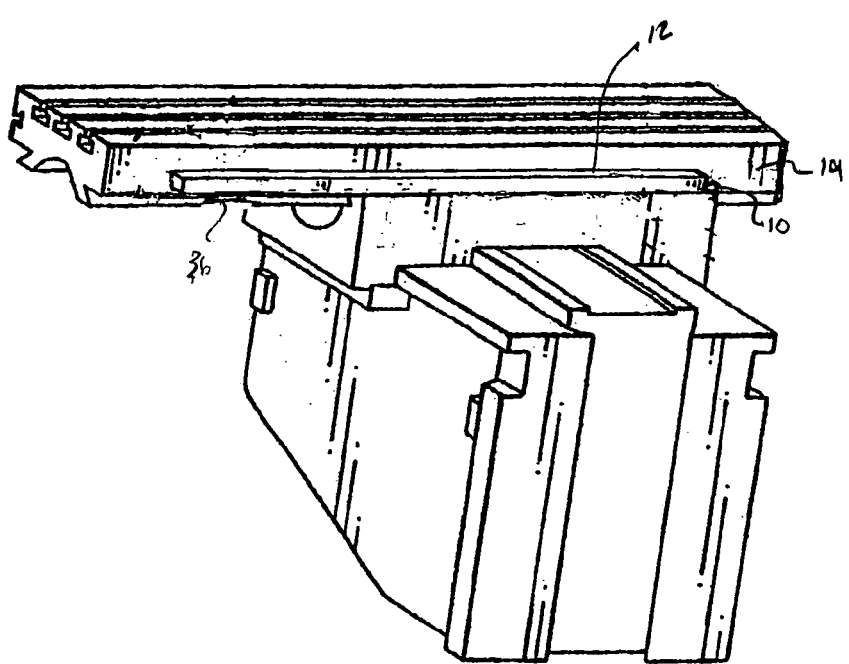
FIG. 11 is a perspective view of the machine tool with a leveled encoder mounted thereon.

Next, as illustrated in FIG. 9, without translating the component of the machine tool carrying surface 14, the indicator is repositioned so as to face a front surface 56 of the encoder 12 for example, adjacent bracket set 36, and set to zero. The component of the machine tool carrying surface 14 is then translated to its original terminal position, as illustrated in FIG. 10, so that the measuring device measures a distance of the front surface 56 of the encoder in the direction y at the opposite end of encoder 12 adjacent bracket set 10. Bracket set 10 is then adjusted, for example, by shifting threaded post 18 along the y-axis or shifting the encoder 12 on mounting lug 22. Bracket set 10 is then secured in place, for example, by tightening the locking fasteners 19, 30, 31 and set screw 44. FIG. 11 illustrates the leveled encoder 12 mounted to surface 14.

Bracket set 36 provides for a number of different adjustments, which may be used to compensate for the rough positioning of the threaded post mounting holes. The encoder 12 may be shifted along its longitudinal axis by shifting telescoping portions 40 and 42 relative to each other along the x-axis. The encoder 12 may be shifted up or down along the z-axis by shifting the swivel post clamp 20 relative to the bar 16. The encoder 12 may be rotated about the x-axis, e.g., an axis parallel to the longitudinal axis of the encoder 12, by rotating telescoping portions 40 and 42 relative to each other to account for bores in surface 14 that may not be perpendicular to surface 14. The encoder 12 may be moved toward or away from the machine tool to which it is mounted by either shifting the encoder on mounting lug 22 or by shifting the threaded post 18 relative to the bar 16. The encoder 12 may also be rotated about the z-axis by rotating the swivel post clamp 20 relative to the bar 16.

Bracket sets 10 and 38 provide for the identical adjustment as described above with respect to bracket set 36, except that since they include an unitary body for the bar 16, they do not provide for length adjustment along the longitudinal axis of the encoder 12.

Bracket set 38 may be used to provide support to a middle portion of the encoder 12 or spar 50. In which case, the mounting lug 22" of bracket set 38 may be secured within a bore 49 in center support 46, and center support 46 may be connected to the encoder 12 by tightening set screw 48. A hole for the threaded post 18 may be marked and then drilled and tapped after removing the encoder 12 from bracket sets 10 and 36, which are already secured to the machine tool. The threaded post 18" of bracket set 38 is screwed into the hole and the encoder 12 is then mounted back on bracket sets 10, 36 and 38. After which the indicator maybe used to confirm the correct positioning of the middle portion of the encoder, and the bracket set 38 may be adjusted accordingly. As a final step, the reading head is installed on the machine tool.

What is claimed is:

1. A bracket set for mounting an encoder device to a machine tool, comprising:

a first connector connectable to the machine tool;

a first member at least rotationally adjustably connected to the first connector, a longitudinal axis of the first member arranged transverse to a longitudinal axis of the first connector, the first member rotatable about the longitudinal axis of the first connector;

a second member at least rotationally adjustably connected to the first member, a longitudinal axis of the second member arranged transverse to the longitudinal axis of the first member, the second member rotatable about an axis transverse to at least one of (a) the longitudinal axis of the first member and (b) the longitudinal axis of the first connector; and a second connector adjustably connectable to the encoder device, a longitudinal axis of the second connector arranged transverse to the longitudinal axis of the second member and transverse to a longitudinal axis of the encoder device.

2. The bracket set according to claim 1, wherein the first member is extendable in a direction parallel to the longitudinal axis of the first member to adjust a spacing between the first connector and the second member in the direction parallel to the longitudinal axis of the first member.

3. The bracket set according to claim 2, wherein the first member includes a first telescoping segment and a second telescoping segment.

4. The bracket set according to claim 1, wherein the first member is movably connected to the first connector in a direction parallel to the longitudinal axis of the first connector.

5. The bracket set according to claim 1, wherein the second member is movably connected to the first member in a direction parallel to the longitudinal axis of the second member.

6. The bracket set according to claim 1, wherein the second connector is movably connected to the second member in a direction parallel to the longitudinal axis of the second connector.

7. The bracket set according to claim 1, further comprising at least one lock device adapted to lock at least one of (a) the first connector relative to the first member, (b) the first member relative to the second member and (c) the second connector relative to the second member.

8. The bracket set according to claim 7, wherein the lock device includes a set screw.

9. The bracket set according to claim 1, wherein the first connector includes a threaded end.

10. The bracket set according to claim 1, wherein the second connector is adjustably connectable in an opening of at least one of (a) a scale, (b) a spar and (c) a support of the encoder device, the opening extending transversely to the longitudinal axis of the encoder.

11. A bracket system for mounting an encoder device to a machine tool, comprising:
a plurality of bracket sets, each bracket set including:
    a first connector connectable to the machine tool;
    a first member adjustably connected to the first connector, a longitudinal axis of the first member arranged transverse to a longitudinal axis of the first connector;
    a second member adjustably connected to the first member, a longitudinal axis of the second member arranged transverse to the longitudinal axis of the first member; and
    a second connector adjustably connectable to the encoder device, a longitudinal axis of the second connector arranged transverse to the longitudinal axis of the second member.

12. The bracket system according to claim 11, wherein the first member of at least one bracket set is extendable in a direction parallel to the longitudinal axis of the first member to adjust a spacing between the first connector and the second member in the direction parallel to the longitudinal axis of the first member.

13. The bracket system according to claim 11, wherein a first bracket set is adjustably connectable to a first end of the encoder device, and a second bracket set is adjustably connectable to a second end of the encoder device.

14. The bracket system according to claim 13, wherein a third bracket set is adjustably connectable to the encoder device at a location in between the first end and the second end.

15. The bracket system according to claim 13, wherein the third bracket set is adjustably connectable to a support of the encoder device.

16. The bracket system according to claim 11, wherein the first member is rotatable about the longitudinal axis of the first connector, the second member is rotatable about an axis transverse to at least one of (a) the longitudinal axis of the first member and (b) the longitudinal axis of the first connector, and the longitudinal axis of the second connector is arranged transverse to the longitudinal axis of the second member and transverse to a longitudinal axis of the encoder device.

17. A system, comprising:
an encoder device mountable on a machine tool;
a first bracket set connectable to a first end of the encoder device; and
a second bracket set connectable to a second end of the encoder device;
wherein each bracket set includes:
    a first connector connectable to the machine tool;
    a first member adjustably connected to the first connector, a longitudinal axis of the first member arranged transverse to a longitudinal axis of the first connector;
    a second member adjustably connected to the first member, a longitudinal axis of the second member arranged transverse to the longitudinal axis of the first member; and
    a second connector adjustably connectable to the encoder device, a longitudinal axis of the second connector arranged transverse to the longitudinal axis of the second member.

18. The system according to claim 17, wherein each bracket set is adjustably connectable to at least one of (a) a scale and (b) a spar of the encoder device.

19. The system according to claim 17, further comprising a third bracket set connectable to the encoder device in between the first end and the second end, the third bracket set including:
    a first connector connectable to the machine tool;
    a first member adjustably connected to the first connector, a longitudinal axis of the first member arranged transverse to a longitudinal axis of the first connector;
    a second member adjustably connected to the first member, a longitudinal axis of the second member arranged transverse to the longitudinal axis of the first member; and
    a second connector adjustably connectable to the encoder device, a longitudinal axis of the second connector arranged transverse to the longitudinal axis of the second member.

20. The system according to claim 19, wherein the third bracket set is adjustably connectable to a support of the encoder device.

21. The system according to claim 17, wherein the first member of at least one of (a) the first bracket set and (b) the second bracket set is extendable in a direction parallel to the longitudinal axis of the first member to adjust a spacing between the first connector and the second member in the direction parallel to the longitudinal axis of the first member.

22. The system according to claim 17, wherein the longitudinal axis of the second connector of each bracket set is arranged orthogonal to a longitudinal axis of the encoder device.

23. The system according to claim 17, wherein the encoder device includes an opening arranged at each of the first end and the second end, the opening arranged orthogonal to a longitudinal axis of the encoder device, the second connectors insertable into the openings.

24. The system according to claim 17, wherein the first member is rotatable about the longitudinal axis of the first connector, the second member is rotatable about an axis transverse to at least one of (a) the longitudinal axis of the first member and (b) the longitudinal axis of the first connector, and the longitudinal axis of the second connector is arranged transverse to the longitudinal axis of the second member and transverse to a longitudinal axis of the encoder device.

* * * * *